Aug. 18, 1964 P. J. McGANNON 3,145,326

MAGNETIC SUPPORTING ARRANGEMENT

Filed March 7, 1961

INVENTOR
P. J. Mc GANNON
BY
[signature]
ATTORNEY

United States Patent Office 3,145,326

Patented Aug. 18, 1964

3,145,326

MAGNETIC SUPPORTING ARRANGEMENT

Patrick J. McGannon, 2797 Stevens St., Oceanside, N.Y.

Filed Mar. 7, 1961, Ser. No. 93,903

12 Claims. (Cl. 317—159)

The present invention relates generally to article supporting arrangements and particularly to such arrangements employing magnetic means for supplying the supporting forces.

According to the present invention magnetic material is provided to define two walls forming therebetween a magnetic gap having a cross-section which is substantially wedge-shaped, means is embodied in or associated with the wall structure for maintaining a magnetic potential across the gap, and thin supporting tabs are provided with magnetic wedge-shaped ends insertable into the gap so that the thin edges thereof and the width of the tabs partially complete the magnetic circuit across the gap between the walls thereof, whereby the tab is magnetically supported between its edges in the said gap, thereby in turn to support an article attached to the other end of the tab.

It is, of course, old and well known to employ a magnetic gap across which a piece of magnetic material may be magnetically supported and to in turn support an article attached to the said piece of material. Such prior arrangements are also known where the supported article is itself magnetic, such as a knife blade, et cetera, and is held to a magnetic gap by itself bridging the gap. These known arrangements, however, require considerable extent of gap length for supporting the magnetic elements since the latter are usually held in the gap by forces effective over a broad surface of the elements. Thus, these prior arrangements have been rather inefficient due to the extremely long gaps required to hold a plurality of articles or due to the few number of articles which can be supported at one time by a given length of gap.

An object of the present invention is to provide an arrangement of the type outlined above and which is devised to allow a considerable number of thin articles to be supported at the same time in the same relatively short magnetic gap.

A feature of the present invention whereby the foregoing object is accomplished is the provision of a wedge-shaped gap wherein may be inserted a thin magnetic tab so that the tab edges mate with opposite walls of the gap, whereby thin articles, such as sheets of paper, film, fabric, and the like, may be attached to tabs individual thereto and held in the gap side-by-side along the length of the gap.

The foregoing feature of the present invention lends the latter particularly useful for many purposes. For instance, the supporting arrangement of the invention may be employed as the page holding means in a loose-leaf notebook where two or more such arrangements may be employed as embodied in the back of such a notebook having the usual hinged covers. As other examples, the present invention finds utility in arrangements for supporting film for drying, for supporting X-rays for viewing, for supporting a plurality of articles of a flat nature in a prescribed order side-by-side such as in a filing system, et cetera. Many other similar uses of the invention will suggest themselves to those skilled in the art.

A further feature of the present invention is the provision of permanent magnets as the means for supplying the holding forces across the gap. Either or both walls of the gap may comprise permanently magnetized material or the two walls may comprise the two ends of a continuous piece of magnetic material having the ends thereof permanently magnetized as oppositely polarized magnets. Furthermore, the wall material may advantageously be of laminated construction, in which case the separate laminations may advantageously have a thickness comparable to the thickness of the tabs so as to present a very efficient holding gap per tab.

Another feature of the invention is the provision of thin, relatively wide, elongated tabs wherein one end is adapted to be attached to an article to be supported and the other end is wedge-shaped and magnetic so as to be insertable into the gap and supported therein by forces effective across the gap through the edges of said other tab end. A considerable number of such tabs can be supported in the same gap side-by-side along the length of the gap. Such tabs can conveniently be made of magnetic material throughout, so as to be capable of being made in a stamping or other similar manufacturing process. The article supporting ends of these tabs can be arranged to be riveted, crimped, pasted, et cetera, to the sheet material to be supported thereby.

Another feature of the present invention is the provision of non-magnetic material enclosing the magnetic material making the gap. Such non-magnetic material may be molded plastic or the like wherein the magnetic material forming the walls of the gap may be encased so as to leave the gap open and to provide non-magnetic material at the ends of the gap as end stops.

Other features of the present invention will be apparent from the subsequent detailed description of exemplary embodiments thereof as illustrated in the accompanying drawings for which brief descriptions may be as follows.

Figure 1:
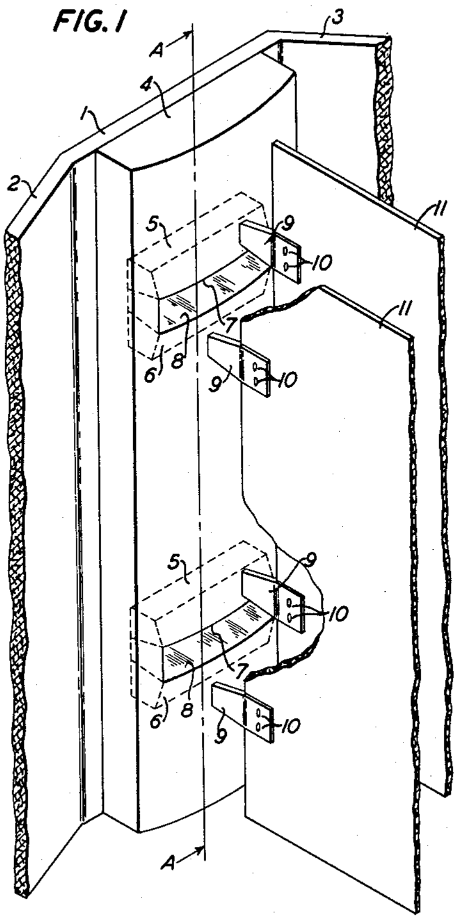
FIG. 1 illustrates in perspective an embodiment of the invention as it might be used in the construction of a loose-leaf notebook.

FIG. 1 shows a suggested loose-leaf notebook embodying supporting arrangements according to the invention for holding sheets of paper in the notebook. Element 1 is the back of such a notebook and elements 2 and 3 represent suitable covers hinged to the back 1. A supporting member 4 may be molded plastic, or similar material and construction, for encasing magnetic supporting arrangements according to the invention. Permanent magnets 5 and 6 are encased within the material 4, which preferably should be of non-magnetic material. Magnets 5 and 6 form walls 7 and 8 defining therebetween an air gap extending in length across the width of the back 4 of the notebook. The cross-section of the gap is wedge-shaped with the larger dimensions of the gap toward the surface of the plastic material 4 to facilitate the insertion therein of the wedge-shaped tab 9 to which is pinned or riveted or crimped or pasted at 10 a sheet of paper 11 or other article to be supported. Tab 9 may be of magnetic material throughout; but, it will be understood that only the wedge-shaped end need be magnetic since the end which is attached to the sheet 11 does not depend upon being magnetic in order to accomplish its function. As will be seen in each of the figures, except FIG. 6, the tab 9 is a thin, relatively wide, elongated member and is insertable into the air gap between the walls 7 and 8 so as to mate with these walls. Actually, there will be small air gaps between the tab edges and the walls 7 and 8 due to the impossibility of truly mating these abutting surfaces. These air gaps will have effective thereacross magnetic forces which will exhibit the necessary holding forces to hold the tab 9 edgewise in the gap, thereby permitting a number of such tabs 9 to be held side-by-side in the gap between walls 7 and 8 along the length of the gap.

As will be seen from FIG. 1, there are two supporting arrangements provided encased in the plastic material 4 in order to use two tabs 9 per sheet 11 to be held in the notebook. It will be obvious that as many such arrangements and tabs 9 could be used as the particular situation necessitates.

Figure 6:
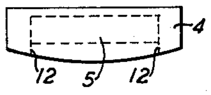
FIG. 6 shows the appearance of the gap portion of the supporting structure of FIG. 1 looking in the vertical direction in FIG. 1 with the notebook back and covers removed and with the tab and supported article removed.

With reference to FIG. 6, which is a view looking down upon the top of the material 4 of FIG. 1 and showing in dotted lines the top magnet 5 of the upper arrangement of FIG. 1, it will be seen that the plastic material 4 encases the magnet 5 so as to form end stops 12 at the ends of the gap formed between the walls 7 and 8. These end stops 12 are not necessary for successful practice of the invention; but, such end stops 12 may be desirable to insure that tabs 9 will not be able to be forced out of the gap at the ends thereof.

Figure 2:
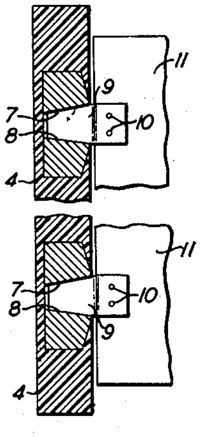
FIGS. 2, 3, 4 and 5 illustrate cross-sections of various forms of the invention as might be seen along the line A—A of FIG. 1 if FIG. 1 embodied these particular forms of the invention.

FIG. 2 is a sectional view of the supporting arrangements of FIG. 1 looking in the direction of the line A—A and showing particularly the cross-section of the wedge-shaped gap with the tab 9 inserted fully therein so that the thin edges of the tab 9 substantially mate with the walls 7 and 8. The plastic material 4 has been broken away in order to conserve space.

Figure 3:
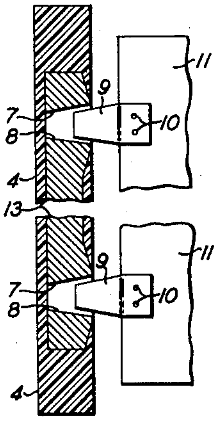

FIG. 3 illustrates another version of the invention where the two supporting arrangements (such as the top and bottom arrangements of FIG. 1) make use of a common piece of magnetic material shown in FIG. 3 broken away at edges 13.

Figure 4:
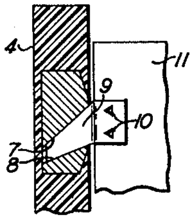

FIG. 4 illustrates another form of the wedge-shaped gap and tab 9 whereby the wedge aspect of the arrangement results in a mechanical advantage for holding purposes in addition to the magnetic forces effective across the gap through the tab 9. This type of arrangement would be particularly advantageous in the event that the material 4 were to be used primarily in a position other than horizontal. In the latter situation, the angular nature of the wedge would provide mechanical support against the tab, et cetera, inadvertently being removed from the wedge-shape gap.

Figure 5:
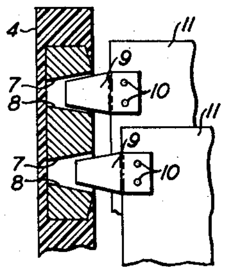

FIG. 5 shows how one arrangement can be constructed so as to afford two gaps fairly close to each other so that alternate tabs 9 can be inserted, if desired, into alternate gaps. Such an arrangement would enable a closer packing of sheets 11.

Figure 7:
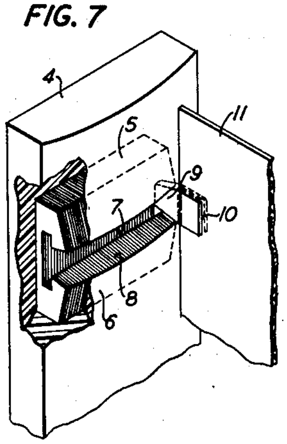
FIG. 7 shows in perspective and partially in section a laminated gap structure using continuous material for the magnetic gap poles; and, FIGS. 8, 9 and 10 show three types of supporting tabs illustrating three methods of attaching the tab to an article to be supported thereby.

FIG. 7 shows in perspective, and partially in section, an arrangement according to the invention wherein the walls 7 and 8 of the gap are formed by the inside surfaces of a U-shaped permanent magnet 5–6, which in turn is made of laminations.

Figure 8:
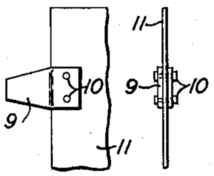
Figure 9:
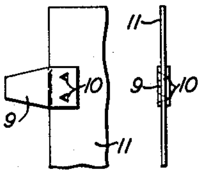
Figure 10:
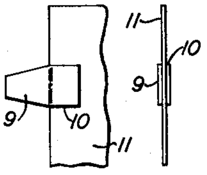

FIGS. 8, 9 and 10 show three methods of attaching tabs 9 to pieces of paper 11. In FIG. 8, the tab 9 is pinned or riveted at 10 to the paper 11; FIG. 9 illustrates a crimped type of attachment 10; and, in FIG. 10, the tab 9 has a bifurcated end whereby a paper 11 may be inserted into the bifurcation and pasted therein with the necessary adhesive being on the tab 9 or on the paper 11 or applied to the attaching point by external means.

The embodiments described hereinbefore are merely examples of the application of principles of the invention. Other embodiments, as well as variations of features of the invention, will become apparent to those skilled in the art without departing from the spirit and scope of the invention.

What is claimed is:

1. An article supporting arrangement comprising magnetic material defining two walls forming therebetween a gap having a substantially wedge-shaped cross-section; means for maintaining magnetic potential across said gap between said walls; and, a thin relatively wide elongated tab, one end of said tab comprising means for attaching said tab to an article to be supported, the other end of said tab comprising magnetic material and being wedge-shaped so as to be insertable into said gap such that opposite thin tab edges of said other end substantially mate with opposite walls of said gap; whereby, said other end of said tab partially completes a magnetic circuit across said gap between opposite walls thereof and is magnetically supported within said gap by magnetic forces effective between mating portions of said other end of said tab and said walls due to said magnetic potential.

2. The invention defined in claim 1 wherein said walls are longitudinally coextensive to form therebetween an elongated gap; and, wherein said maintaining means maintains magnetic potential throughout the length of said gap.

3. The invention defined in claim 2 wherein said maintaining means maintains a substantially constant magnetic potential throughout the length of said gap.

4. The invention defined in claim 3 wherein said maintaining means comprises permanently magnetized material in at least one of said walls.

5. The invention defined in claim 4 wherein said maintaining means comprises oppositely polarized permanent magnet material in opposite walls.

6. The invention defined in claim 5 wherein said maintaining means comprises oppositely polarized permanent magnets which in turn comprise the said magnetic material defining said walls.

7. The invention defined in claim 1 wherein said mating portions of said other tab end and said walls form magnetic gaps therebetween and across which said supporting magnetic forces are effective.

8. The invention defined in claim 7 wherein said tab comprises continuous magnetic material throughout.

9. The invention defined in claim 1 wherein is provided non-magnetic supporting material substantially enclosing said magnetic material except those parts thereof forming said gap.

10. The invention defined in claim 9 wherein said non-magnetic material provides non-magnetic walls substantially closing both ends of said gap.

11. An article supporting arrangement comprising magnetic material defining two longitudinally coextensive walls forming therebetween an elongated air gap having a substantially wedge-shaped cross-section; at least one of said wall materials comprising a permanent magnet for maintaining magnetic potential across said gap and for maintaining said magnetic potential substantially constant throughout the length of said gap; and, a thin relatively wide elongated magnetic tab, one end of said tab comprising means for attaching said tab to an article to be supported, the other end of said tab being wedge-shaped so as to be insertable into said gap such that opposite thin tab edges of said other end substantially mate with opposite walls of said gap to form small air gaps between mating portions of said walls and said tab edges; whereby, said other end of said tab partially completes a magnetic circuit across said gap between opposite walls thereof and is magnetically supported within said gap by magnetic forces effective between said mating portions due to said magnetic potential.

12. The invention defined in claim 11 wherein said two wall materials comprise oppositely polarized permanent magnets; and, wherein is provided non-magnetic supporting material substantially enclosing said magnets except those parts thereof forming said gap, said non-magnetic material forming non-magnetic walls substantially closing both ends of said gap.

References Cited in the file of this patent

UNITED STATES PATENTS 2,731,663 Thompson -------------- Jan. 24, 1956

FOREIGN PATENTS 436,832 Great Britain ----------- Oct. 18, 1935